United States Patent [19]

Matsuoka

[11] Patent Number: 4,949,297
[45] Date of Patent: Aug. 14, 1990

[54] ADDER HAVING MEANS FOR REDUCING PROPAGATION TIME OF CARRY BIT

[75] Inventor: Shigeki Matsuoka, Suita, Japan
[73] Assignee: Ricoh Company, Ltd., Tokyo, Japan
[21] Appl. No.: 236,541
[22] Filed: Aug. 25, 1988
[30] Foreign Application Priority Data
  Sep. 8, 1987 [JP] Japan .................... 62-224839
[51] Int. Cl.$^5$ .......................................... G06F 7/50
[52] U.S. Cl. .................................................. 364/787
[58] Field of Search .......................................... 364/787
[56] References Cited

U.S. PATENT DOCUMENTS

| | | | |
|---|---|---|---|
| 4,425,623 | 1/1984 | Russell | 364/787 |
| 4,464,729 | 8/1984 | Mlynek | 364/787 |
| 4,504,924 | 3/1985 | Cook et al. | 364/787 |
| 4,584,660 | 4/1986 | Young et al. | 364/787 |
| 4,817,031 | 3/1989 | Tokumaru | 364/787 |

*Primary Examiner*—David H. Malzahn
*Attorney, Agent, or Firm*—Cooper & Dunham

[57] ABSTRACT

An adder has first through third switching circuits, a logic circuit and an adding circuit part. The first switching circuit is coupled between a carry bit input terminal and a carry bit output terminal. The second switching circuit is coupled between a first power source voltage and the carry bit output terminal, and the third switching circuit is coupled between a second power source voltage and the carry bit output terminal. The logic circuit controls the ON/OFF states of the first through third switching circuits so that only one switching circuit is turned ON responsive to two binary values which are to be added in the adding circuit part. The propagation time of a carry bit signal from the carry bit input terminal to the carry bit output terminal is constant regardless of the number of bits of the adding circuit part.

14 Claims, 7 Drawing Sheets

ADDER HAVING MEANS FOR REDUCING PROPAGATION TIME OF CARRY BIT

BACKGROUND OF THE INVENTION

The present invention generally relates to adders, and more particularly to an adder for adding binary numbers in an electronic calculator and the like.

The operation speed of an adder which adds two binary numbers can be increased effectively by reducing the propagation speed of a carry bit. Various proposals have been made to reduce the propagation time of the carry bit. FIG. 1 shows an example of a conventional 4-bit adder.

The 4-bit adder comprises a plurality of NAND gates $100_0$ through $100_3$, NOR gates $101_0$ through $101_3$ and $102_0$ through $102_3$, AND gates $103_0$ through $103_3$ and 104 through 117, exclusive-OR gates $118_0$ through $118_3$ and inverters 119 and 120. A circuit part 130 indicated by a phantom line corresponds to a circuit for quickly outputting a carry bit signal $C_3$. A composite gate 131 made up of AND-NOR gates is inserted between a carry bit input terminal for receiving a carry bit signal $C_{-1}$ and a carry bit output terminal for outputting a carry bit signal $C_3$. The carry bit signal $C_{-1}$ from a lower adder (not shown) is applied to the carry bit input terminal, and the carry bit signal $C_3$ to a higher adder (not shown) is outputted from the carry bit output terminal.

In FIG. 1, $A_0$ through $A_3$ denote bits of a first binary value which is to be added to a second binary value, $B_0$ through $B_3$ denote bits of the second value and $S_0$ through $S_3$ denote bits of a binary sum of the first and second binary values.

FIG. 2 shows an example of a composite gate made up of a 2-input AND gate 140, a 3-input AND gate 141 and a 2-input NOR gate 142. Further, FIG. 3 shows the actual circuit construction of the composite gate shown in FIG. 2 constituted by n-channel metal oxide semiconductor (MOS) transistors Q1 through Q10. In FIGS. 2 and 3, a, b, c, d and e denote input signals of the composite gate and OUT denotes an output signal of the composite gate outputted from an output terminal.

As may be seen from FIG. 3, each of the signals a through e passes through two or three n-channel transistors. Hence, when the load capacitance of the output terminal is denoted by C and the resistance per n-channel transistor is denoted by R, the time constant of the signal propagation can be described by 2RC or 3RC. As a result, in the case of the adder shown in FIG. 1 and described above, the time constant of the carry bit propagation becomes 5RC, and a further reduction in the propagation time of the carry bit is prevented thereby.

Therefore, in this conventional adder, the propagation time of the carry bit is high because of the number of transistors used and the time constant of the bit propagation determined by the load capacitance of the output terminal and the resistances of the transistors.

SUMMARY OF THE INVENTION

Accordingly, it is a general object of the present invention to provide a novel and useful adder in which the problems described heretofore are eliminated.

Another and more specific object of the present invention is to provide an adder in which the propagation time of a carry bit is increased compared to that of a conventional adder. According to the adder of the present invention, it is possible to considerably increase the operation speed of the adder because the propagation time of the carry bit is decreased.

Still another object of the present invention is to provide an adder comprising first input terminals for receiving bits of a first binary value, second input terminals for receiving bits of a second binary value which is to be added to the first binary value, a carry bit input terminal for receiving a carry bit signal, a carry bit output terminal for outputting a carry bit signal, a first switching circuit coupled between the carry bit input terminal and the carry bit output terminal, a second switching circuit coupled between the carry bit output terminal and a first power source voltage, a third switching circuit coupled between the carry bit output terminal and a second power source voltage, an adding circuit part for adding the bits of the first binary value received through the first input terminals and the bits of the second binary value received through the second input terminals, and a logic circuit for controlling ON/OFF states of the first through third switching circuits responsive to the bits of the first and second values received through the first and second input terminals. The logic circuit supplies a control signal to each of the first through third switching circuits so that the first switching circuit is turned ON and the second and third switching circuits are turned OFF when all of the bits of the first binary value differ from the corresponding bits of the second binary value, the second switching circuit is turned ON and the first and third switching circuits are turned OFF when one bit of the first binary value coincides with a corresponding bit of the second binary value and corresponding bits on a higher significant side of the one bit differ between the first and second binary values, and otherwise the third switching circuit is turned ON and the first and second switching circuits are turned OFF. According to the adder of the present invention, it is possible to considerably reduce the propagation time of the carry bit signal from the carry bit input terminal to the carry bit output terminal. In addition, the propagation time of the carry bit signal is constant regardless of the number of bits of the adding circuit part.

A further object of the present invention is to provide an adding circuit comprising first through nth adders coupled in parallel, where each of the adders have identical circuit construction and comprise first input terminals for receiving bits of a first binary value, second input terminals for receiving bits of a second binary value which is to be added to the first binary value, a carry bit input terminal for receiving a carry bit signal, a carry bit output terminal for outputting a carry bit signal, a first switching circuit coupled between the carry bit input terminal and the carry bit output terminal, a second switching circuit coupled between the carry bit output terminal and a first power source voltage, a third switching circuit coupled between the carry bit output terminal and a second power source voltage, an adding circuit part for adding the bits of the first binary value received through the first input terminals and the bits of the second binary value received through the second input terminals, and a logic circuit supplied with the first and second values received through the first and second input terminals for controlling ON/OFF states of the first through third switching circuits. The logic circuit supplies a control signal to each of the first through third switching circuits so that the first switching circuit is turned ON and the second and third switching circuits are turned OFF when all of the bits of the first binary value differ from the corresponding bits of the second binary value, the second switching circuit is turned ON and the first and third switching circuits are turned OFF when one bit of the first binary value coincides with a corresponding bit of the second binary value and corresponding bits on a higher significant side of the one bit differ between the first and second binary values, and otherwise the third switching circuit is turned ON and the first and second switching circuits are turned OFF. The carry bit input terminal of an ith adder is supplied with the carry bit signal from the carry bit output terminal of a (i−1)th adder, where i is an arbitrary integer from 1 (one) to n.

Other objects and further features of the present invention will be apparent from the following detailed description when read in conjunction with the accompanying drawings.

DETAILED DESCRIPTION

Figure 4:
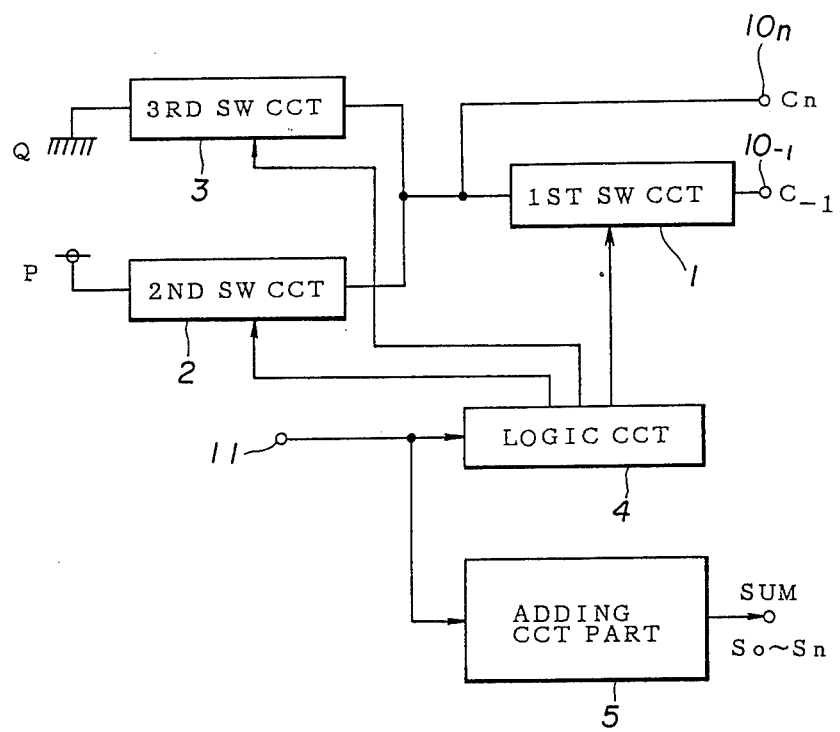
FIG. 4 is a system block diagram showing a first embodiment of the adder according to the present invention.

FIG. 4 shows a first embodiment of an adder according to the present invention. The adder comprises first, second and third switching circuits 1, 2 and 3, a logic circuit 4, and an adding circuit part 5. A carry bit signal $C_{-1}$ from a lower order adder (not shown) is applied to a carry bit input terminal $10_{-1}$, and a carry bit signal $C_n$ to be supplied to a higher order adder (not shown) is outputted from a carry bit output terminal $10_n$. Bits of a first (binary) value and bits of a second (binary) value which is to be added to the first value are applied to input terminals 11.

The first switching circuit 1 is coupled between the carry bit input terminal $10_{-1}$ and the carry bit output terminal $10_n$. The second switching circuit 2 is coupled between the carry bit output terminal $10_n$ and a node P which is at an active level. In addition, the third switching circuit 3 is coupled between the carry bit output terminal $10_n$ and a node Q which is at an inactive level.

The first switching circuit 1 is controlled by an output signal of the logic circuit 4 so that the first switching circuit 1 is only turned ON when all of the bits of the first value are different from the bits of the second value, and the first switching circuit 1 is otherwise turned OFF. On the other hand, the second switching circuit 2 is controlled by an output signal of the logic circuit 4 so that the second switching circuit 2 is turned ON only when a certain bit of the first value and a corresponding bit of the second value coincide but all of the bits of the first value on the higher significant side of the certain bit are different from the corresponding bits of the second value, and the second switching circuit 2 is otherwise turned OFF. Furthermore, the third switching circuit 3 is controlled by an output signal of the logic circuit 4 so that the third switching circuit 3 is only turned ON when both the first and second switching circuits 1 and 2 are turned OFF, and the third switching circuit 3 is otherwise turned OFF.

When the resistance of each of the first through third switching circuits 1 through 3 is denoted by R and a load capacitance at the output terminal $10_n$ is denoted by C, the time constant of the carry bit signal $C_{-1}$ from the carry bit input terminal $10_{-1}$ to the carry bit output terminal $10_n$ is described by RC regardless of the number n of bits of the adder. Accordingly, the propagation time of the carry bit is considerably reduced compared to that of the conventional adder.

Figure 5:
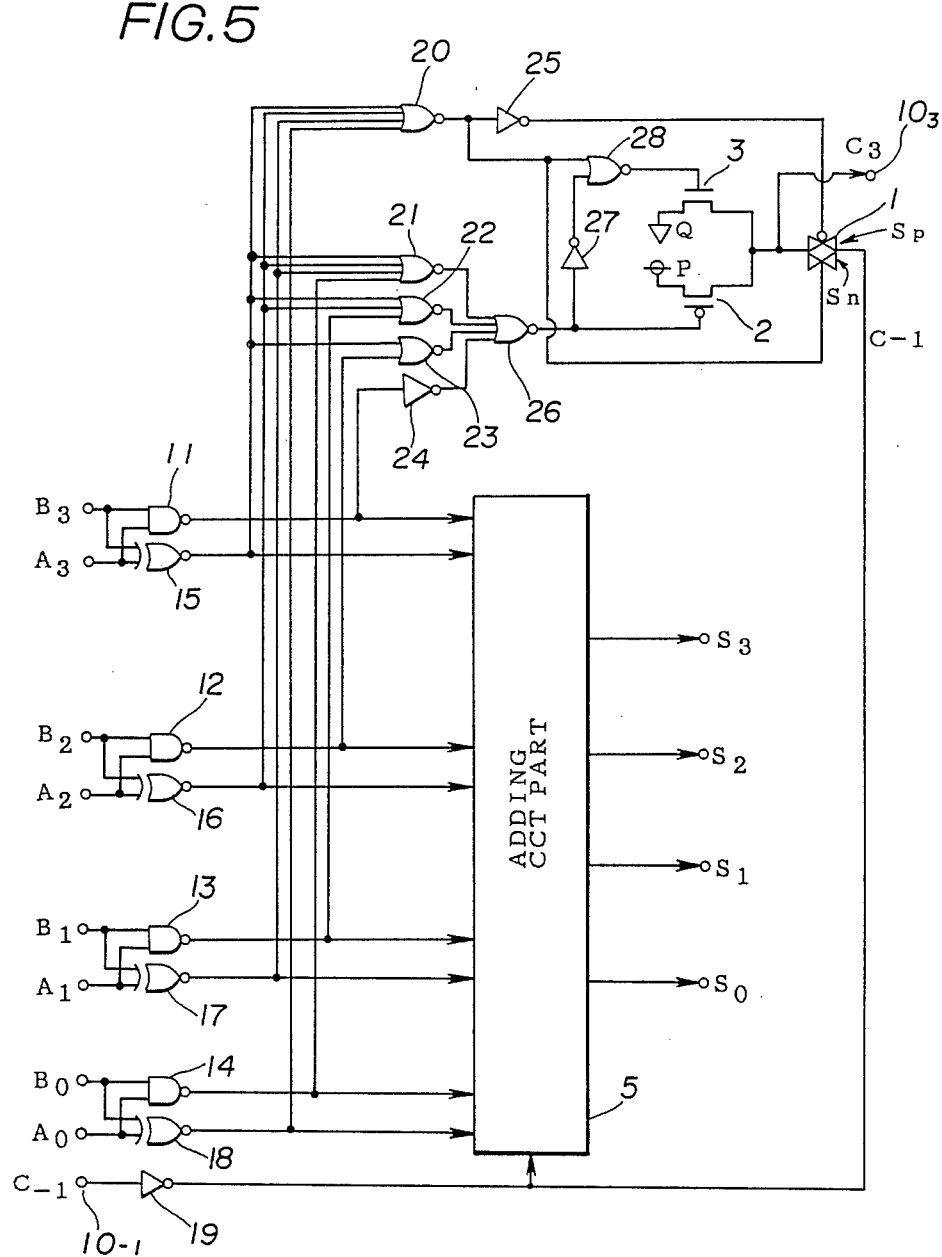
FIG. 5 is a system circuit diagram showing the circuit construction of a first embodiment.

FIG. 5 is a circuit diagram showing the circuit construction of the first embodiment for four bits. In FIG. 5, those parts which are the same as those corresponding parts in FIG. 4 are designated by the same reference numerals. In FIG. 5, $A_0$ through $A_3$ denote bits of the first value which is to be added to the second value, $B_0$ through $B_3$ denote bits of the second value and $S_0$ through $S_3$ denote bits of a sum of the first and second values. In addition, $C_{-1}$ denotes a carry bit signal which is obtained from a lower order adder (not shown) and is applied to the carry bit input terminal $10_{-1}$ as a least significant bit signal, and $C_3$ denotes a carry bit signal which is supplied to higher order adder (not shown) and is outputted from a carry bit output terminal $10_3$ as a most significant bit signal.

The bits $A_0$ through $A_3$ of the first value are supplied to first input terminals of corresponding NAND gates 11 through 14 and corresponding exclusive-NOR gates 15 through 18. The bits $B_0$ through $B_3$ of the second value are supplied to second input terminals of the corresponding NAND gates 11 through 14 and the corresponding exclusive-NOR gates 15 through 18. Output signals of the NAND gates 11 through 14 and output signals of the exclusive-NOR gates 15 through 18 are supplied to the adding circuit part 5. The adding circuit part 5 has a circuit construction which will be described later in conjunction with FIG. 7 and outputs bits $S_0$ through $S_3$ of the sum of the first and second values. The carry bit signal $C_{-1}$ from the carry bit input terminal $10_{-1}$ is also supplied to the adding circuit part 5.

A NOR circuit 20 is supplied with the output signals of the exclusive-NOR gates 15 through 18, and a NOR gate 21 is supplied with the output signals of the exclusive-NOR gates 15 through 17 and the NAND gate 14. A NOR gate 22 is supplied with the output signals of the exclusive-NOR gates 15 and 16 and the NAND gate 13. In addition, a NOR gate 23 is supplied with the output signals of the exclusive-NOR gate 15 and the NAND gate 12. An inverter 24 is supplied with the output signal of the NAND gate 11.

An output signal of the NOR gate 20 is supplied to an n-channel part Sn of the first switching circuit 1, and is also supplied to a p-channel part Sp of the first switching circuit 1 through an inverter 25. The first switching circuit 1 is also supplied with the carry bit signal $C_{-1}$ from the carry bit input terminal $10_{-1}$.

Figure 6:
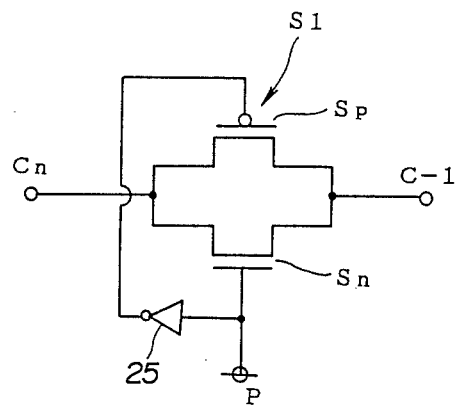
FIG. 6 is a circuit diagram showing a first embodiment of a first switching circuit of the first embodiment.

FIG. 6 shows a first embodiment of the first switching circuit 1. The n-channel part Sn is an n-channel transistor and the p-channel part Sp is a p-channel transistor. The carry bit signal $C_{-1}$ from the carry bit input terminal $10_{-1}$ is applied to one end of the first switching circuit 1, and the other end of the first switching circuit 1 is coupled to the second and third switching circuits 2 and 3 and the carry bit output terminal $10_3$. The second switching circuit 2 is a p-channel transistor, and the third switching circuit 3 is an n-channel transistor. The other end of the second switching circuit 2 is coupled to the active level, and the other end of the third switching circuit 3 is coupled to the inactive level, that is, grounded in this case.

Output signals of the NOR gates 21 through 24 are supplied to a NOR gate 26, and an output signal of the NOR gate 26 is applied to the second switching circuit 2 as a control signal. The output signals of the NOR gate 20 and the output signal of the NOR gate 26 obtained through an inverter 27 are supplied to a NOR gate 28. An output signal of the NOR gate 28 is applied to the third switching circuit 3 as a control signal.

Accordingly, the first switching circuit 1 is turned ON when all of the bits $A_0$ through $A_3$ of the first value are different from the corresponding bits $B_0$ through $B_3$ of the second value.

The second switching circuit 2 is turned ON when one of the bits $A_0$ through $A_3$ of the first value coincides with the corresponding one of the bits $B_0$ through $B_3$ of the second value and the corresponding bits on the higher significant side of the one bit are different between the first and second values.

The third switching circuit 3 is turned ON when both the first and second switching circuits 1 and 2 are turned OFF.

First, a description will be given of the case where all of the bits $A_0$ through $A_3$ of the first value are different from the corresponding bits $B_0$ through $B_3$ of the second value, that is, when the bit of the first value is "0" when the corresponding bit of the second value is "1" and vice versa. In this case, the output signals of the NAND gates 11 through 14 all become high ("1"), and the output signals of the exclusive-NOR gates 15 through 18 all become low ("0"). Hence, the NOR gate 20 outputs a high-level signal, and a high-level signal is applied to the n-channel transistor of the first switching circuit 1 while a low-level signal is applied to the p-channel transistor of the first switching circuit 1. As a result, the first switching circuit 1 is turned ON. In addition, because the high-level signal from the NOR gate 20 is supplied to the NOR gate 28, the NOR gate 28 outputs a low-level signal regardless of the level at the other input terminal thereof. For this reason, the third switching circuit 3 is turned OFF. Further, the high-level signals from the NAND gates 14 through 11 are supplied to the NOR gates 21 through 23 and the inverter 24. Thus, the NOR gates 21 through 24 all output a low-level signal, and the NOR gate 26 outputs a high-level signal. Consequently, the second switching circuit 2 is turned OFF.

Next, a description will be given of the case where the corresponding bits $A_1$ and $B_1$ both become "1" from the above described state where only the first switching circuit 1 is turned ON and the second and third switching circuits 2 and 3 are turned OFF. In this case, the NAND gate 13 outputs a low-level signal and the exclusive-NOR gate 17 outputs a high-level signal. Accordingly, a high-level signal is supplied to one of the input terminals of the NOR gate 20 thereby inverting the output signal level of the NOR gate 20 from high to low level. As a result, the first switching circuit 1 is turned OFF from the ON state. In addition, since all of the input signals of the NOR gate 22 become low, the NOR gate 22 outputs a high-level signal. The output signal level of the NOR gate 26 is inverted from high to low level, and as a result, the second switching circuit 2 is turned ON from the OFF state. On the other hand, a high-level signal is supplied to the NOR gate 28 through the inverter 27. Hence, the output signal level of the NOR gate 28 remains at the low level, and the third switching circuit 3 remains in the OFF state.

Next, a description will be given of the case where the bits $A_1$ and $B_1$ both become low in the above described state where only the second switching circuit 2 is turned ON and the first and third switching circuits 1 and 3 are turned OFF. In this case, the output signal of the NOR gate 20 is low, and the first switching circuit 1 remains in the OFF state. In addition, a high-level signal is supplied to each of the NOR gates 21 through 23 and the inverter 24. As a result, the NOR gates 21 through 23 and the inverter 24 respectively output a low-level signal, and the NOR gate 26 outputs a high-level signal thereby turning the second switching circuit 2 OFF. Furthermore, both the input signals of the NOR gate 28 are low, and the NOR gate 28 outputs a high-level signal thereby turning the third switching circuit 3 ON.

In the described embodiment, description is only given of one example of the case where only the second switching circuit 2 is turned ON and the case where only the third switching circuit 3 is turned ON. However, the switching circuits 2 and 3 can be turned ON for other combinations of the bits $A_0$ through $A_3$ and $B_0$ through $B_3$ of the first and second values. The following Table is a truth table showing the ON and OFF states of the first through third switching circuits 1 through 3 for various combinations of the bits $A_0$ through $A_3$ and $B_0$ through $B_3$ of the first and second values, where SW1 through SW3 denote the first through third switching circuits 1 through 3, "X" denotes an OFF state and "*" denotes an ON state of the switching circuit. Due to space limitation, the Table is divided into Tables 1 through 4.

TABLE 1

| $B_3$ | $A_3$ | $B_2$ | $A_2$ | $B_1$ | $A_1$ | $B_0$ | $A_0$ | SW1 | SW2 | SW3 |
|---|---|---|---|---|---|---|---|---|---|---|
| 0 | 0 | 0 | 0 | 0 | 0 | 0 | 0 | X | X | * |
| 0 | 0 | 0 | 0 | 0 | 0 | 0 | 1 | X | X | * |
| 0 | 0 | 0 | 0 | 0 | 0 | 1 | 0 | X | X | * |
| 0 | 0 | 0 | 0 | 0 | 0 | 1 | 1 | X | X | * |
| 0 | 0 | 0 | 0 | 0 | 1 | 0 | 0 | X | X | * |
| : | : | : | : | : | : | : | : | : | : | : |
| 0 | 1 | 0 | 1 | 0 | 0 | 1 | 1 | X | X | * |
| 0 | 1 | 0 | 1 | 0 | 1 | 0 | 0 | X | X | * |
| 0 | 1 | 0 | 1 | 0 | 1 | 0 | 1 | * | X | X |
| 0 | 1 | 0 | 1 | 0 | 1 | 1 | 0 | * | X | X |
| 0 | 1 | 0 | 1 | 1 | 1 | 1 | 1 | X | * | X |
| 0 | 1 | 0 | 1 | 1 | 0 | 0 | 0 | X | X | * |
| 0 | 1 | 0 | 1 | 1 | 0 | 0 | 1 | * | X | X |
| 0 | 1 | 0 | 1 | 1 | 0 | 1 | 0 | * | X | X |
| 0 | 1 | 0 | 1 | 1 | 0 | 1 | 1 | X | * | X |
| 0 | 1 | 0 | 1 | 1 | 1 | 0 | 0 | X | * | X |
| 0 | 1 | 0 | 1 | 1 | 1 | 0 | 1 | X | * | X |
| 0 | 1 | 0 | 1 | 1 | 1 | 1 | 0 | X | * | X |
| 0 | 1 | 0 | 1 | 1 | 1 | 1 | 1 | X | * | X |
| 0 | 1 | 1 | 0 | 0 | 0 | 0 | 0 | X | X | * |
| 0 | 1 | 1 | 0 | 0 | 0 | 0 | 1 | X | X | * |

TABLE 1-continued

| B3 | A3 | B2 | A2 | B1 | A1 | B0 | A0 | SW1 | SW2 | SW3 |
|----|----|----|----|----|----|----|----|-----|-----|-----|
| 0 | 1 | 1 | 0 | 0 | 0 | 1 | 0 | X | X | * |
| 0 | 1 | 1 | 0 | 0 | 0 | 1 | 1 | X | X | * |

TABLE 2

| B3 | A3 | B2 | A2 | B1 | A1 | B0 | A0 | SW1 | SW2 | SW3 |
|----|----|----|----|----|----|----|----|-----|-----|-----|
| 0 | 1 | 1 | 0 | 0 | 1 | 0 | 1 | * | X | X |
| 0 | 1 | 1 | 0 | 0 | 1 | 1 | 0 | * | X | X |
| 0 | 1 | 1 | 0 | 0 | 1 | 1 | 1 | X | * | X |
| 0 | 1 | 1 | 0 | 1 | 0 | 0 | 0 | X | X | * |
| 0 | 1 | 1 | 0 | 1 | 0 | 0 | 1 | * | X | X |
| 0 | 1 | 1 | 0 | 1 | 0 | 1 | 0 | * | X | X |
| 0 | 1 | 1 | 0 | 1 | 0 | 1 | 1 | X | * | X |
| 0 | 1 | 1 | 0 | 1 | 1 | 0 | 0 | X | * | X |
| 0 | 1 | 1 | 0 | 1 | 1 | 0 | 1 | X | * | X |
| : | : | : | : | : | : | : | : | : | : | : |
| 0 | 1 | 1 | 1 | 1 | 1 | 0 | 1 | X | * | X |
| 0 | 1 | 1 | 1 | 1 | 1 | 1 | 0 | X | * | X |
| 0 | 1 | 1 | 1 | 1 | 1 | 1 | 1 | X | * | X |
| 1 | 0 | 0 | 0 | 0 | 0 | 0 | 0 | X | X | * |
| 1 | 0 | 0 | 0 | 0 | 0 | 0 | 1 | X | X | * |
| 1 | 0 | 0 | 0 | 0 | 0 | 1 | 0 | X | X | * |
| 1 | 0 | 0 | 0 | 0 | 0 | 1 | 1 | X | X | * |
| : | : | : | : | : | : | : | : | : | : | : |
| 1 | 0 | 0 | 1 | 0 | 0 | 1 | 1 | X | X | * |
| 1 | 0 | 0 | 1 | 0 | 1 | 0 | 0 | X | X | * |
| 1 | 0 | 0 | 1 | 0 | 1 | 0 | 1 | * | X | X |
| 1 | 0 | 0 | 1 | 0 | 1 | 1 | 0 | * | X | X |
| 1 | 0 | 0 | 1 | 0 | 1 | 1 | 1 | X | * | X |

TABLE 3

| B3 | A3 | B2 | A2 | B1 | A1 | B0 | A0 | SW1 | SW2 | SW3 |
|----|----|----|----|----|----|----|----|-----|-----|-----|
| 1 | 0 | 0 | 1 | 1 | 0 | 0 | 0 | X | X | * |
| 1 | 0 | 0 | 1 | 1 | 0 | 0 | 1 | * | X | X |
| 1 | 0 | 0 | 1 | 1 | 0 | 1 | 0 | * | X | X |
| 1 | 0 | 0 | 1 | 1 | 0 | 1 | 1 | X | * | X |
| 1 | 0 | 0 | 1 | 1 | 1 | 0 | 0 | X | * | X |
| 1 | 0 | 0 | 1 | 1 | 1 | 0 | 1 | X | * | X |
| 1 | 0 | 0 | 1 | 1 | 1 | 1 | 0 | X | * | X |
| 1 | 0 | 0 | 1 | 1 | 1 | 1 | 1 | X | * | X |
| 1 | 0 | 1 | 0 | 0 | 0 | 0 | 0 | X | X | * |
| 1 | 0 | 1 | 0 | 0 | 0 | 0 | 1 | X | X | * |
| 1 | 0 | 1 | 0 | 0 | 0 | 1 | 0 | X | X | * |
| 1 | 0 | 1 | 0 | 0 | 0 | 1 | 1 | X | X | * |
| 1 | 0 | 1 | 0 | 0 | 1 | 0 | 0 | X | X | * |
| 1 | 0 | 1 | 0 | 0 | 1 | 0 | 1 | * | X | X |
| 1 | 0 | 1 | 0 | 0 | 1 | 1 | 0 | * | X | X |
| 1 | 0 | 1 | 0 | 0 | 1 | 1 | 1 | X | * | X |
| 1 | 0 | 1 | 0 | 1 | 0 | 0 | 0 | X | X | * |
| 1 | 0 | 1 | 0 | 1 | 0 | 0 | 1 | * | X | X |
| 1 | 0 | 1 | 0 | 1 | 0 | 1 | 0 | * | X | X |
| 1 | 0 | 1 | 0 | 1 | 0 | 1 | 1 | X | * | X . |
| 1 | 0 | 1 | 0 | 1 | 1 | 0 | 0 | X | * | X |
| 1 | 0 | 1 | 0 | 1 | 1 | 0 | 1 | X. | * | X |
| : | : | : | : | : | : | : | : | : | : | : |

TABLE 4

| B3 | A3 | B2 | A2 | B1 | A1 | B0 | A0 | SW1 | SW2 | SW3 |
|----|----|----|----|----|----|----|----|-----|-----|-----|
| 1 | 1 | 1 | 1 | 1 | 1 | 0 | 1 | X | * | X |
| 1 | 1 | 1 | 1 | 1 | 1 | 1 | 0 | X | * | X |
| 1 | 1 | 1 | 1 | 1 | 1 | 1 | 1 | X | * | X |

Figure 7:
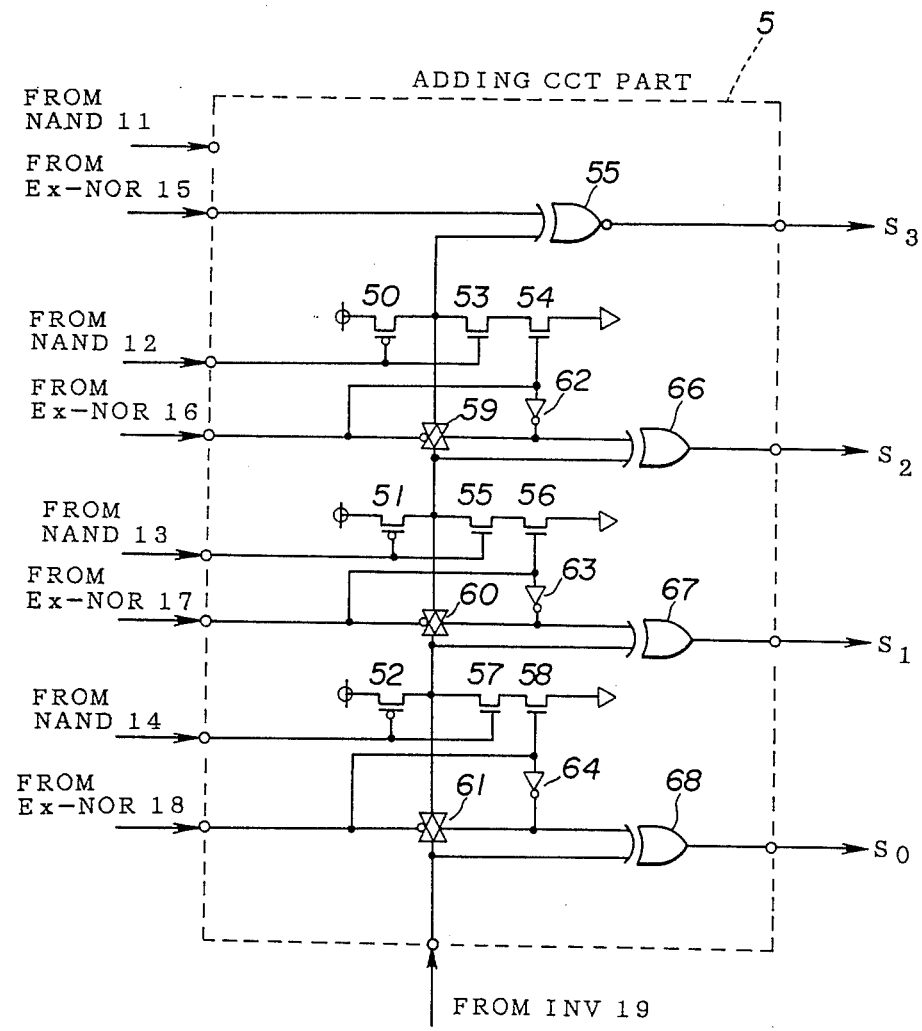
FIG. 7 is a circuit diagram showing an embodiment of an adding circuit part of the first embodiment.

FIG. 7 shows an embodiment of the adding circuit part 5 shown in FIG. 5. In FIG. 7, those parts which are the same as those corresponding parts in FIG. 5 are designated by the same reference numerals, and a description thereof will be omitted.

The adding circuit part 5 shown in FIG. 7 has p-channel transistors 50 through 52, n-channel transistors 53 through 58, switching circuits 59 through 61, inverters 62 through 64, an exclusive-NOR gate 65 and exclusive-OR gate 66 through 68 which are connected as shown.

In FIG. 5, the gate 11 through 18, 20 through 23, 26 and 28, and the inverters 24, 25 and 27 constitute the logic circuit 4 shown in FIG. 4.

Figure 8:
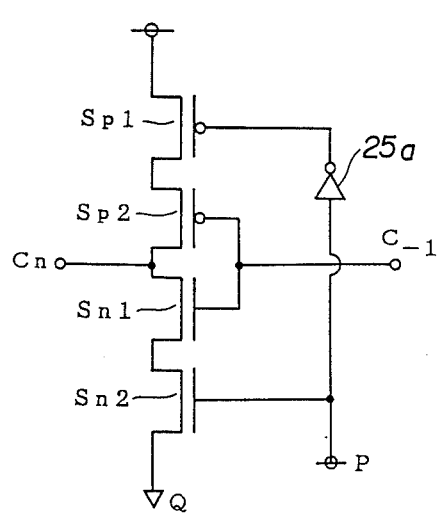
FIG. 8 is a circuit diagram showing a second embodiment of the first switching circuit of the first embodiment.

FIG. 8 shows a second embodiment of the first switching circuit 1. In FIG. 8, the first switching circuit 1 has two p-channel transistors Sp1 and Sp2 and two n-channel transistors Sn1 and Sn2 which are coupled in series and an inverter 25a which are connected as shown.

Figure 9:
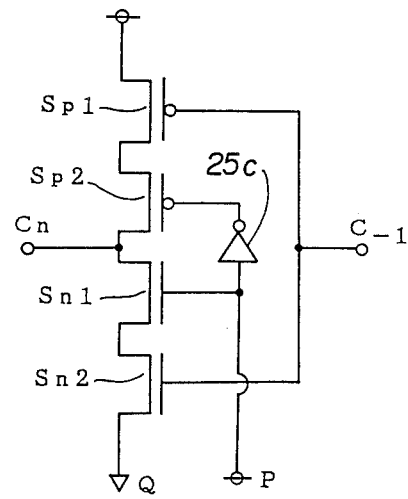
FIG. 9 is a circuit diagram showing a third embodiment of the first switching circuit of the first embodiment.

FIG. 9 shows a third embodiment of the first switching circuit 1. In FIG. 9, those parts which are the same as those corresponding parts in FIG. 8 are designated by the same reference numerals. The first switching circuit 1 has the two p-channel transistors Sp1 and Sp2 and the two n-channel transistors Sn1 and Sn2 and an inverter 25b which are connected as shown.

Figure 10:
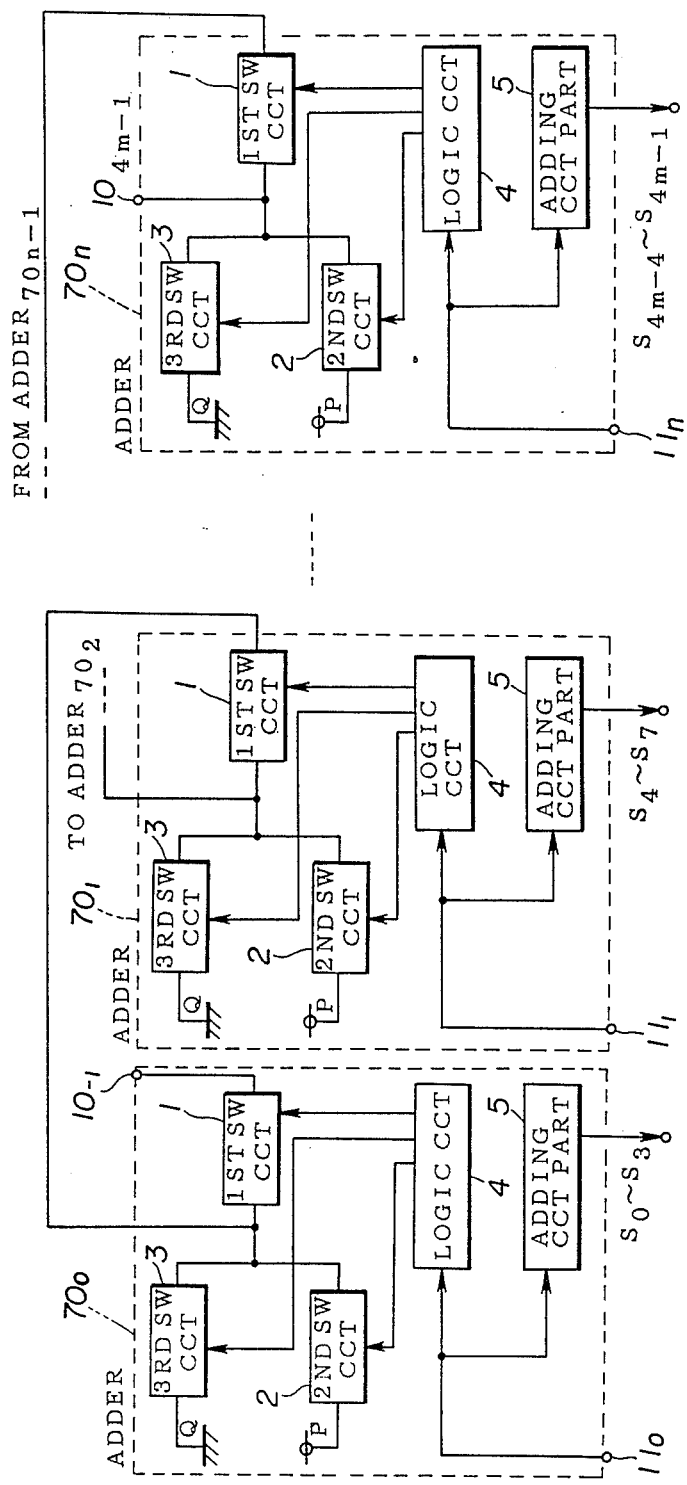
FIG. 10 is a system block diagram showing a second embodiment of the adder according to the present invention.

Next, a description will be given on a second embodiment of the adder according to the present invention, by referring to FIG. 10 which shows the second embodiment. In FIG. 10, those parts which are the same as those corresponding parts in FIG. 4 are designated by the same reference numerals, and a description thereof will be omitted. In the present embodiment, the adder has $(n+1)$ 4-bit adders $70_0$ through $70_n$ coupled in parallel. In FIG. 10, $m = 1, 2, \ldots, n$.

The effects obtainable by this embodiment are substantially the same as those obtainable by the first embodiment.

Figure 1:
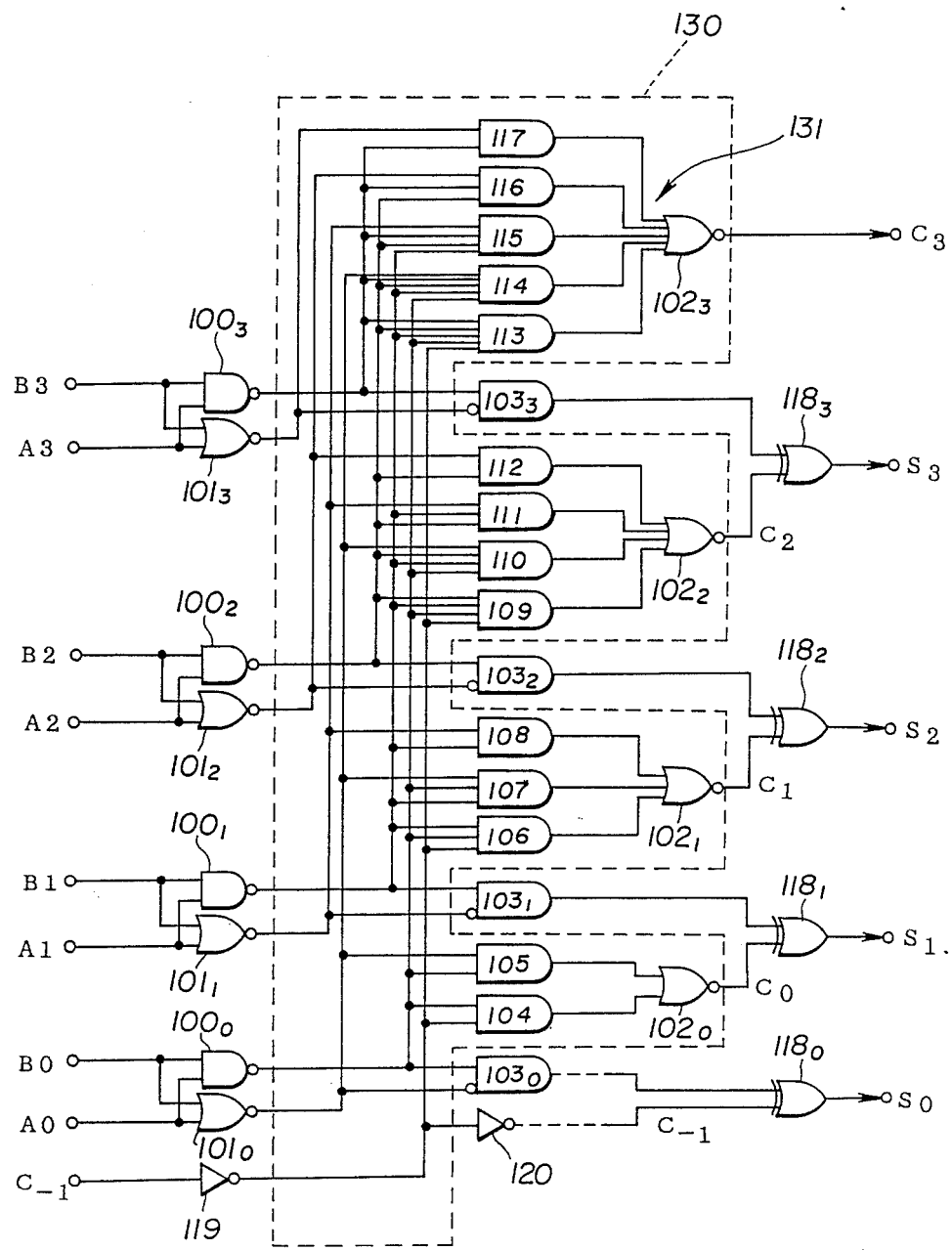
FIG. 1 is a system circuit diagram showing an example of a conventional 4-bit adder.
Figure 2:
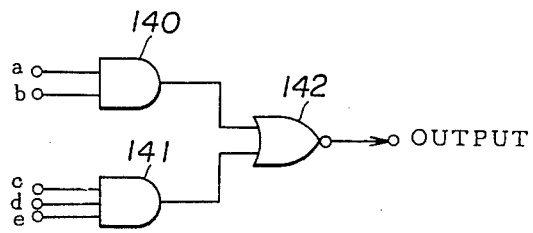
FIG. 2 is a system circuit diagram showing an example of a composite gate constituted by AND-NOR gates.
Figure 3:
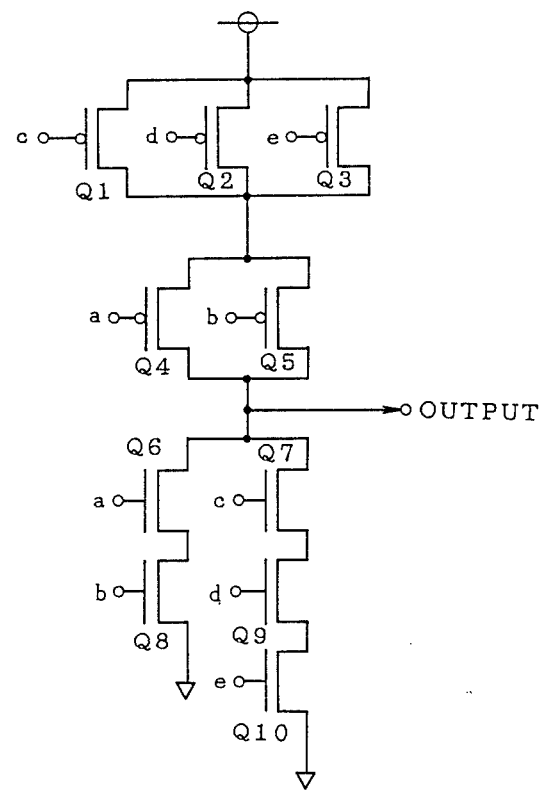
FIG. 3 is a circuit diagram showing the actual circuit construction of the composite gate shown in FIG. 2.

With respect to a conventional 4-bit adder, for example, the propagation time required for the carry bit signal $C_{-1}$ to be transmitted to the carry bit output terminal $10_3$ which outputs the carry bit signal $C_3$ is 5 RC when the resistance of one transistor is denoted by R and the load capacitance of the output terminal is denoted by C, as may be seen from FIG. 3 described before. This means that the propagation time of the carry bit signal is $(n+1)RC$ with respect to such a conventional n-bit adder. On the other hand, the propagation time of the carry bit signal is RC in the case of the 4-bit adder of this embodiment of the invention, and according to the present invention, the propagation time of the carry bit signal is RC regardless of the number of bits of the adder. Therefore, it can be readily seen that the propagation time of the carry bit signal with respect to the n-bit adder is considerably reduced according to the present invention and that the reduction in the propagation time is especially notable as the number n of bits of the adder becomes large.

Further, the present invention is not limited to these embodiments, but various variations and modifications may be made without departing from the scope of the present invention.

What is claimed is:

1. An adder comprising:
   first input terminals for receiving bits of a first binary value;
   second input terminals for receiving bits of a second binary value which is to be added to the first binary value;
   a carry bit input terminal for receiving a carry bit signal;
   a carry bit output terminal for outputting a carry bit signal;
   a first switching circuit coupled between said carry bit input terminal and said carry bit output terminal;

a second switching circuit coupled between said carry bit output terminal and a first power source voltage;

a third switching circuit coupled between said carry bit output terminal and a second power source voltage;

wherein each of said second and third switching circuits comprises only a single transistor;

an adding circuit part for adding the bits of the first binary value received through said first input terminals and the bits of the second binary value received through said second input terminals; and a logic circuit for controlling ON/OFF states of said first through third switching circuits responsive to the bits of the first and second binary values received through said first and second input terminals, said logic circuit supplying a control signal to each of said first through third switching circuits so that said first switching circuit is turned ON and said second and third switching circuits are turned OFF when all of the bits of the first binary value differ from the corresponding bits of the second binary value, said second switching circuit is turned ON and said first and third switching circuits are turned OFF when one bit of the first binary value coincides with a corresponding bit of the second binary value and corresponding bits on a higher significant side of the one bit differ between the first and second binary values, and otherwise said third switching circuit is turned ON and said second switching circuits are turned OFF.

2. An adder as claimed in claim 1 in which said first switching circuit comprises a p-channel transistor and an n-channel transistor which are coupled in parallel.

3. An adder as claimed in claim 1 in which said first switching circuit comprises two p-channel transistors and two n-channel transistors which are coupled in series.

4. An adder as claimed in claim 1 in which said first power source voltage is higher than said second power source voltage.

5. An adder as claimed in claim 4 in which said second power source voltage is a ground voltage.

6. An adder as claimed in claim 1 in which a propagation time of the carry bit signal from said carry bit input terminal to said carry bit output terminal is constant regardless of a number of bits of said adding circuit part.

7. An adder as claim in claim 6 in which the propagation time is described by RC, where R denotes a resistance of a transistor included in the switching circuit which is turned ON and C denotes a load capacitance at said carry bit output terminal.

8. An adding circuit comprising first through nth adders coupled in parallel, each of said adders having identical circuit construction and comprising:

first input terminals for receiving bits of a first binary value;

second input terminals for receiving bits of a second binary value which is to be added to the first binary value;

a carry bit input terminal for receiving a carry bit signal;

a carry bit output terminal for outputting a carry bit signal;

a first switching circuit coupled between said carry bit input terminal and said carry bit output terminal;

a second switching circuit coupled between said carry bit output terminal and a first power source voltage;

a third switching circuit coupled between said carry bit output terminal and a second power source voltage;

wherein each of said second and third switching circuits comprises only a single transistor;

an adding circuit part for adding the bits of the first binary value received through said first input terminals and the bits of the second binary value received through said second input terminals; and a logic circuit supplied with the first and second binary values received through said first and second input terminals for controlling ON/OFF states of said first through third switching circuits, said logic circuit supplying a control signal to each of said first through third switching circuits so that said first switching circuit is turned ON and said second and third switching circuits are switched OFF when all of the bits of the first binary value differ from the corresponding bits of the second binary value, said second switching circuit is turned ON and said first and third switching circuits are turned OFF when one bit of the first binary value coincides with a corresponding bit of the second binary value and corresponding bits on a higher significant side of the one bit differ between the first and second binary values, and otherwise said third switching circuit is turned ON and said first and second switching circuits are turned OFF, a said carry bit input terminal of an ith adder being supplied with a carry bit signal from a said carry bit output terminal of a (i−1)th adder, where i is an arbitrary integer from one to n.

9. An adder as claimed in claim 8 in which said first switching circuit comprises a p-channel transistor and an n-channel transistor which are coupled in parallel.

10. An adder as claimed in claim 8 in which said first switching circuit comprises two p-channel transistors and two n-channel transistors which are coupled in series.

11. An adder as claim in claim 8 in which said first power source voltage is higher than said second power source voltage.

12. An adder as claimed in claim 11 in which said second power source voltage is a ground voltage.

13. An adder as claimed in claim 8 in which a propagation time of the carry bit signal from said carry bit input signal terminal to said carry bit output terminal is constant regardless of a number of bits of said adding circuit part.

14. An adder as claimed in claim 13 in which the propagation time is described by RC, where R denotes a resistance of a transistor included in the switching circuit which is turned ON and C denotes a load capacitance at said carry bit output terminal.

* * * * *